Feb. 4, 1936.         W. B. PARKER         2,029,338
                      INSPIRATING NOZZLE
                      Filed Oct. 31, 1934
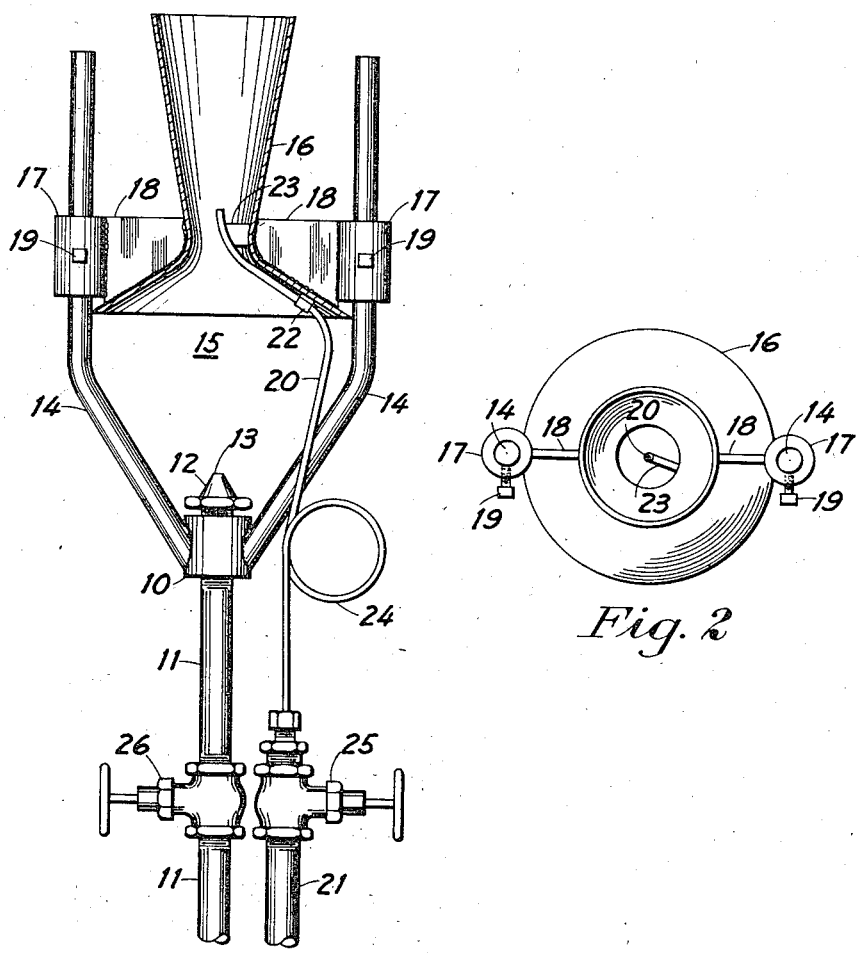
Inventor
William B. Parker
By: *JH Adams*
      Attorney Patented Feb. 4, 1936

2,029,338

UNITED STATES PATENT OFFICE 2,029,338

INSPIRATING NOZZLE

William B. Parker, Placerville, Calif., assignor to California Spray-Chemical Corporation, Berkeley, Calif., a corporation of Delaware Application October 31, 1934, Serial No. 750,756

6 Claims. (Cl. 299—142)

This invention relates to nozzles in which a jet of air is used to atomize or disperse a liquid, such as a liquid insecticide or fungicide, and particularly to one in which a quantity of supplementary atmospheric air is inspirated to aid in the dispersing and diluting of the atomized liquid to form a floating fog-like mist.

Heretofore, air nozzles have been arranged to aspirate and atomize liquid from a similar nozzle placed at right angles thereto, as in the conventional paint spray gun. These are well adapted for the purpose named, i. e., the formation of a spray of fine liquid particles to give a complete and uniform coating of appreciable thickness on a surface to be painted. Attempts have been made to adapt this construction to the atomizing and dispersion of liquid insecticides and fungicides, but without complete success. This appears to be due primarily to the excessive fineness of the spray droplets, and to the fact that they are so thickly concentrated in the blast that it is ordinarily impossible to move the blast quickly enough to get adequate coverage of the foliage or plant growth without completely drenching the same. Another disadvantage is the short length and bushiness of the spray, which does not carry through foliage or against adverse wind currents.

This invention, however, contemplates the inspiration of a quantity of supplementary atmospheric air which is effective not only to atomize the liquid into particles of the optimum size, but to disperse or dilute and carry the same so that there will be no danger of completely coating or drenching the plant growth being treated. There are in use a great number of the so-called paint spray gun type devices, including the prime mover, liquid tank, air compressor, hose lines and distributor pipes, to which this invention may conveniently be applied, thereby converting them to the more desirable improved form which produces a suitably divided and dispersed fog-like mist, which will persist in the air for an appreciable time, and will be adequate to contact and destroy the pest without damage to the plant growth.

It is an object of this invention to provide a nozzle construction that will utilize a high velocity air jet to entrain or inspirate a large quantity of atmospheric air, which is then available to atomize and/or disperse and carry a liquid insecticide or fungicide.

Another object is to provide a nozzle arrangement that will be adjustable to give various particle sizes, and which will be simple and economical to construct and operate.

Another object is to provide a nozzle arrangement that is adapted to be attached to existing agricultural spray equipment to improve the operation thereof.

A further object is to provide a nozzle construction that will utilize a given quantity of liquid insecticide or the like more effectively, by dispersing the particles within a rapidly moving blast of air having a considerable volume, so that the coverage of the plant growth may be adequate but not wasteful of material.

These and other objects and advantages of the invention will become further apparent from the description which follows, and from the accompanying drawing, which forms a part of this specification and illustrates a preferred embodiment of the invention.

In the drawing:

Figure 1 is a top view, partially in section, of a nozzle assembly adapted to be used with liquid insecticides or fungicides.

Figure 2 is an end view of the nozzle shown in Figure 1.

Referring to the drawing, the numeral 10 represents a sleeve or collar, adapted to be received on the end of air supply pipe 11. A nozzle tip 12 is secured to the inner end of collar 11 and is provided with a small axial jet opening 13. A pair of outwardly and forwardly extending rods 14 are welded to opposite sides of collar 10 and form an axially aligned bifurcated frame or support for the adjustable nozzle head generally designated 15.

Nozzle head 15 consists of a Venturi shaped nozzle 16, supported between sleeves 17 by web plates 18. Set screws 19 are provided in sleeve 17 to secure head 15 at the desired axial distance from air nozzle 12. If desired, sleeves 17 could be fixed to rods 14, and collar 10 be arranged to be slidable along air pipe 11. This would involve no material departure from the arrangement illustrated and would fulfill the general requirement that head 15 be axially aligned with and adjustable with regard to air nozzle 12.

A liquid delivery conduit or tube 20 leads from liquid supply pipe 21, is secured to Venturi nozzle 16 as by a small clip 22 and is aligned with the axis of the Venturi nozzle by a thin strut 23. Under some circumstances it may be found desirable to use a plurality of liquid delivery tubes, in order to obtain uniform distribution of the liquid, but this is ordinarily not required. Tube 20 is preferably looped as at 24 to provide flexibility and allow head 15 to be adjusted on rods 14. The outlet tip of tube 20 within the throat of venturi 16, may be open ended, as shown, or may be fitted with a conventional nozzle to provide an initial atomization of the liquid insecticide or fungicide.

Liquid is supplied to the tube 20 from any suitable source (not shown) through pipe 21, and its flow rate controlled by valve 25. Air under 50–100 pounds per square inch is supplied to the pipe 11 from the usual compressor found on the paint spray gun type of equipment previously described, and is controlled by valve 26.

In operation, the air jet from nozzle tip 12 is directed into the entrance to Venturi nozzle 16. This will be found to inspirate a large quantity of atmospheric air, so that the blast issuing from the outlet of nozzle 16 will be found to be five to eight times the volume of air supplied to air nozzle 12. Nozzle head 15 may be moved axially of the frame formed by rods 14, until the inspirating effect is at a maximum, which may be determined by holding a thread or piece of string loosely beside the edge of the inlet face of the Venturi nozzle 16. When the thread is neither blown out or drawn in, the position of head 15 with regard to air nozzle 12 may be assumed to be correct.

The liquid rate through tube 20 is adjusted by valve 25 until the desired liquid particle size and "floating" characteristics of the fog-like mist are obtained. Some slight further adjustment of head 15 with respect to air nozzle 12 may be found necessary in this regard.

It will be appreciated that this invention is particularly adapted to be substituted for the conventional right-angled air and liquid nozzle tips now in use on the so-called paint spray gun type of equipment. In contrast to the short, bushy and extremely finely divided sprays produced by the latter, a floating fog-like mist of air-borne particles will be directed from this device, which mist will be carried for relatively long distances through and around the plant growth. Furthermore, it will give a thoroughly effective contact with the pest to be treated without drenching the foliage to damage the same, and without waste of effective material.

Although a specific construction embodying this invention has been described and illustrated, it is to be understood that the invention is not limited to that specific device, and all such modifications and changes as come within the scope of the appended claims are embraced thereby.

I claim:

1. A nozzle of the character described, comprising a frame, an air nozzle supported in said frame, a Venturi nozzle supported in said frame and axially spaced from and aligned with said air nozzle, and a conduit for liquid terminating in said Venturi nozzle, said air nozzle adapted to inspirate atmospheric air into and through said Venturi nozzle to produce a floating, fog-like mist of air-borne liquid particles.

2. A nozzle of the character described, according to claim 1, said frame being of open construction and said Venturi nozzle being adjustable with regard to said air nozzle.

3. A nozzle of the character described, according to claim 1, said frame being bifurcated, and said Venturi nozzle being slidably mounted on said frame.

4. A nozzle of the character described, according to claim 1, said Venturi nozzle, said air nozzle and the termination of said liquid conduit being in substantial axial alignment.

5. In an apparatus for treating plant growth with liquid insecticides and the like, a constricted air nozzle, a Venturi nozzle spaced from said air nozzle and open to the atmosphere at both ends, and means for introducing a liquid into the bore of said Venturi nozzle, said air nozzle adapted to inspirate supplementary atmospheric air into and through said Venturi nozzle to produce from said liquid a floating, fog-like mist of air-borne particles.

6. A nozzle of the character described and adapted to be used with the compressed air and liquid supply pipes of a paint spray gun equipment, comprising a collar adapted to be supported on said air pipe, means forming a frame extending outwardly and forwardly from said collar, a Venturi nozzle slidably mounted on said frame, a flexible conduit leading from said liquid supply pipe to said Venturi nozzle and terminating therein, and an air nozzle for said air pipe arranged to inspirate atmospheric air into and through said Venturi nozzle to produce a floating, fog-like mist of air-borne liquid particles.

WILLIAM B. PARKER.